UNITED STATES PATENT OFFICE.

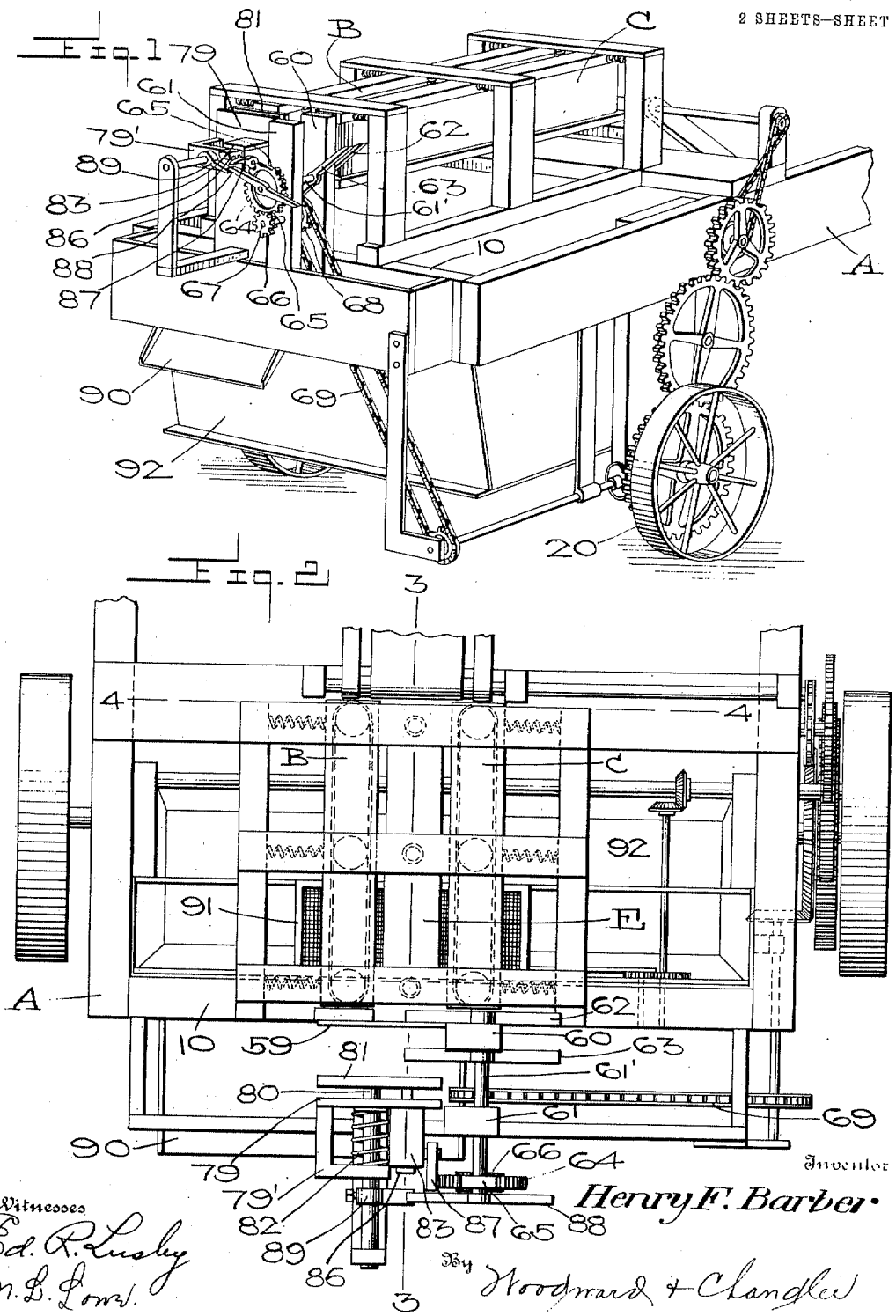

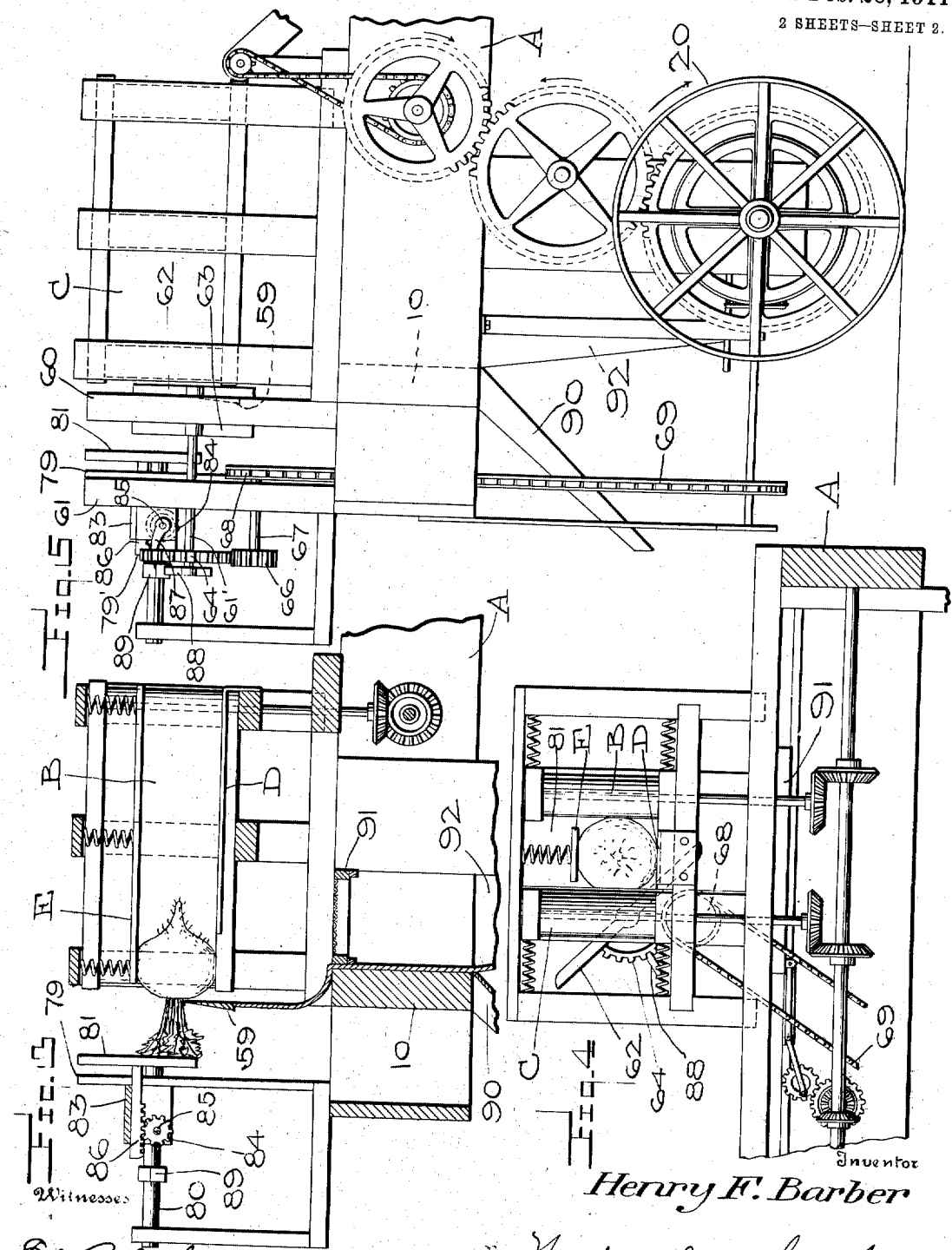

HENRY F. BARBER, OF EDISON, NEBRASKA.

BEET-TOPPING MECHANISM.

985,754.  Specification of Letters Patent.  Patented Feb. 28, 1911.

Application filed August 5, 1909, Serial No. 511,330. Renewed July 1, 1910. Serial No. 570,011.

*To all whom it may concern:*

Be it known that I, HENRY F. BARBER, a citizen of the United States, residing at Edison, in the county of Furnas and State of Nebraska, have invented certain new and useful Improvements in Beet-Topping Mechanism, of which the following is a specification.

This invention relates to beet harvesting machinery and has for its object to provide a mechanism arranged to automatically top beets when delivered thereto.

Another object is to provide a structure of relatively simple arrangement which will not be likely to become deranged and in which replacements may be easily and quickly made when necessary.

Other objects and advantages will be apparent from the following description and it will be understood that changes in the specific structure shown and described may be made within the scope of the claims without departing from the spirit of the invention.

In the drawings forming a portion of this specification and in which like numerals of reference indicate similar parts in the several views, Figure 1 is a perspective view of the complete mechanism, Fig. 2 is a top plan showing the mechanism applied to a portion of the beet harvester, Fig. 3 is a transverse section taken in the plane of the rack arm, Fig. 4 is a view looking at the inner side of the mechanism and showing a beet in position to be topped, Fig. 5 is a view looking at the mechanism from one end.

Referring now to the drawings, there is shown a portion of a beet harvester A, including a rear end member 10, and a pair of vertically disposed horizontally extending and horizontally spaced conveyer members B and C. Between these conveyer members there is located a bottom supporting member D and a top spring pressed member E arranged to engage beets passing between the conveyers. The bottom supporting member terminates short of the rearward end of the conveyers, and disposed opposite to the end of this supporting member there is an upwardly directed knife 59. Laterally of this knife there is an upright 60, and disposed rearwardly of the upright 60 in parallel relation there is a second upright 61. A transverse shaft 61' is journaled in the two uprights, and carries a pair of knocking arms 62 and 63, the former being located forwardly of the upright 60 and the latter rearwardly thereof and between the upright 60 and the upright 61. The arm 62 thus revolves in a plane forwardly of the knife 59 while the arm 63 revolves in a plane rearwardly of the knife, the ends of the arms passing over the sides of the knife when the shaft 61' is revolved. A mutilated gear 64 is carried by the rearward end of the shaft 61', the mutilations of the gear being located directly opposite to each other, as shown at 65, and this gear meshes with the pinion 66 carried by a shaft 67 journaled horizontally in the upright 61 and carrying a sprocket wheel 68 inwardly of the upright. A chain 69 is engaged with the sprocket and is connected with a traction wheel 20 of the machine.

An upright 79 is located rearwardly of the knife 59, and in spaced relation thereto, and engaged in this upright there is a horizontally extending sliding shaft 80, carrying a vertically disposed plate 81 in its inner end which is located opposite to the space between the conveyer members and is arranged to receive thereagainst the tops of beets which pass between the conveyers. The arrangement is thus such that engagement of the plate by the beet top causes the plate to move outwardly, carrying the shaft therewith. The plate is held normally against outward movement by means of a spring 82 engaged between the rearward face of the upright 79 and a bracket 79' which is connected with the upright, and through which the shaft 80 extends. A second bracket 83 is carried by the upright 79 extending rearwardly therefrom parallel to the shaft 80, and has a pinion 84 mounted therein, this pinion being carried by a shaft 85 which extends transversely of the machine and laterally of the movement of the shaft 80. A rack 86 is carried by a stem slidably engaged through the upright 79, and connected with the plate 81, and this rack meshes with the pinion 84 for rotation of the latter when the plate is moved by a beet. A rearwardly extending normally horizontal arm 87 is carried by the shaft 85 and extends normally above an arm 88 secured to the shaft 61'. A finger 89 is secured to the shaft 80 and lies normally in position to receive thereupon one end of the arm 88, the shaft 61' being thus held against operation and with one of the mutilated points 65 of the gear 64 at the pinion 66, the shaft 61' thus remaining stationary. It will be observed, however, that when the plate 81 is moved outwardly, the rack 86 is moved to rotate the pinion 84, the finger 89 being at the same time shifted rearwardly from beneath the end of the arm 88. The movement of the pinion 84 brings the finger 87 downwardly, as will be seen, and into engagement with the arm 88, the arm being thus depressed and the gear 64 slightly revolved to bring its mutilated portion into engagement with the pinion 66, when the gear 64 will be moved throughout one-half rotation, and the arms 62 and 63 will be moved into engagement with the beet which has caused the movement of the plate 81 and which is thus above the knife 59, to move the beet downwardly against the knife and thus cut the top from the beet. The tops fall into a discharge chute 90 while the beets are deposited upon a shaker 91 which transfers them to a dump 92 of suitable structure.

What is claimed is:—

1. In a beet topping mechanism, the combination with a knife, of means for delivering a beet to the knife, arms arranged for movement to press a beet thus delivered against the knife, a power shaft, means for connecting the arms with the power shaft for movement of the arms, and means operable by a beet engaging the knife for movement of the connecting means into operative position.

2. In a beet topping mechanism, the combination with a knife, of a plate located in position for engagement by a beet engaged with the knife, means for moving a beet into engagement with the knife and plate, a slidable shaft connected with the plate for movement therewith, a laterally extending finger carried by the shaft, a rack bar connected with the plate for movement therewith, a pinion meshed with the rack bar for rotation thereby, a revoluble shaft, a power shaft, mutilated gear connections between the power shaft and the revoluble shaft, an arm connected with the mutilated gear and resting normally upon the laterally extending finger of the first named shaft, a lateral arm carried by the pinion and extending above the first named arm for engagement of and movement of the first named arm when the pinion is moved, an arm carried by the revoluble shaft and arranged for engagement of a beet against the knife when the revoluble shaft is rotated.

3. In a beet topping mechanism, the combination with a knife, of arms arranged for movement transversely of the knife, means for moving the arms, said arm moving means lying normally out of operative position, means for holding the arm moving means at times against movement into operative position, means operable by a beet for bringing said holding means out of operative position, and means connected with said beet operable means for bringing the arm moving means into operative position.

4. In a beet topping mechanism, the combination with a knife, of means for delivering a beet to the knife, means for pressing a beet against the knife, said pressing means lying normally out of operative position, and means operable by a beet delivered to the knife for bringing the beet engaging means into operation.

5. A beet topping mechanism comprising a knife, a revoluble shaft, an arm mounted upon the shaft for movement to press a beet against the knife when the shaft is revolved, a stop arm carried by the shaft, a sliding shaft, a stop finger carried by the sliding shaft and arranged to lie normally in position for engagement of the stop arm thereagainst to hold the revoluble shaft against motion, a mutilated gear carried by the revoluble shaft, a rotatable pinion located for engagement with the mutilated gear, a member arranged for engagement by a beet upon the knife to shift the sliding shaft, said stop finger being arranged for movement out of engagement with the stop arm when the shaft is slid, and means for engagement of the stop arm to rotate the mutilated gear into engagement with the pinion when the sliding shaft is moved.

In testimony whereof I affix my signature, in presence of two witnesses.

HENRY F. BARBER.

Witnesses:
R. B. EATON,
R. R. CLARK.